United States Patent Office 3,583,903
Patented June 8, 1971

3,583,903
HYDROCARBON CONVERSION WITH MOLE SIEVE AND SULFUR SELENIUM OR TELLURIUM CATALYST
Joseph N. Miale, Trenton, N.J., and Paul B. Weisz, Media, Pa., assignors to Mobil Oil Corporation
No Drawing. Continuation-in-part of application Ser. No. 611,543, Jan. 25, 1967, which is a continuation-in-part of application Ser. No. 430,466, Feb. 4, 1965, which in turn is a continuation-in-part of application Ser. No. 232,874, Oct. 24, 1962. This application Oct. 18, 1968, Ser. No. 768,886
The portion of the term of the patent subsequent to Oct. 7, 1986, has been disclaimed
Int. Cl. C10g 11/04, 11/06
U.S. Cl. 208—120        22 Claims

ABSTRACT OF THE DISCLOSURE

Briefly, the present invention concerns a new and improved hydrocarbon conversion catalyst, a method for preparing the same and catalytic conversion therewith, the novel catalyst composition comprises a crystalline aluminosilicate having uniform pore openings promoted with at least one and preferably two catalytic components: the essential component selected from the group consisting of sulfur, selenium, tellurium, compounds thereof and mixtures thereof with one another; and the preferable component selected from the group consisting of cations, compounds thereof and mixtures thereof with one another of metallic elements of Groups I-A—V-A, I-B—VII-B and VIII of the Periodic Table.

CROSS-REFERENCES TO RELATED APPLICATIONS

The present application is a continuation-in-part of copending application, Ser. No. 611,543, filed Jan. 25, 1967, now Pat. No. 3,471,412 which is in turn a continuation-in-part of Ser. No. 430,466, filed Feb. 4, 1965, which is in turn a continuation-in-part of application Ser. No. 232,874, filed Oct. 24, 1962, the latter two applications being now abandoned.

BACKGROUND OF THE INVENTION (1) Field of the invention

This invention relates to a novel hydrocarbon conversion catalyst, to methods for preparing it and catalytic conversion in the presence thereof.

(2) Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite K-G (U.S. 3,055,654), and zeolite ZK-5 (U.S. 3,247,195), merely to name a few.

SUMMARY OF THE INVENTION

In accordance with the present invention, there has now been discovered a new and improved catalyst for the conversion of hydrocarbons which comprises a crystalline aluminosilicate, having uniform pore openings, preferably between about 6 and 15 angstrom units, promoted with at least one element selected from the group consisting of sulfur, selenium, tellurium and compounds thereof. Additionally, the improved crystalline aluminosilicate composition may contain, in another preferred embodiment of the invention, at least one component selected from the group consisting of cations and compounds thereof of metallic elements of Groups I-A—V-A, I-B—VII-B and VIII of the Periodic Table. The novel composition is prepared by intimately admixing the aluminosilicate material with the element in powdered form and the resulting mixture heated, or alternatively, vapors of the element to be deposited may be passed into the aluminosilicate to be incorporated therein.

It has now been found that naphthas may be successfully upgraded by contacting them at suitable conditions of temperature and pressure in the presence of hydrogen with a zinc-containing crystalline metallo aluminosilicate zeolite having uniform effective pore openings of about 5 A. By "upgrading" is meant any hydro technique resulting in the formation of an improved or preferred product.

As an additional embodiment of the present invention, it has been found that the activity and effectiveness of the catalysts used herein may be substantially improved by contact with sulfur prior to their use in the selective hydrocracking processes. The catalyst is preferably sulfactivated to enhance its activity by contact either with a sulfur-containing feed or, if the feed has a low sulfur content, with hydrogen sulfide or an added sulfur compound which is readily convertible to hydrogen sulfide at the hydro conditions employed, e.g., carbon disulfide, etc. The extent of this sulfactivation treatment should be sufficient to incorporate 0.5 to 15 weight percent sulfur into the catalyst. The beneficial effect of sulfactivation will be demonstrated in the examples to follow.

DESCRIPTION OF SPECIFIC EMBODIMENTS

The crystalline aluminosilicates employed in preparation of the instant catalyst may be either natural or synthetic zeolites, having uniform pore openings which are capable of accepting the desired reactant, but preferably between about 6 and 15 angstrom units. Illustrative of particularly preferred zeolites are zeolite X, zeolite Y, zeolite L, zeolite T, faujasite and mordenite, merely to mention a few. Presently commercially available there are aluminosilicate materials of the "A" series, having channels or pores of approximately 3 to 5 angstrom units diameter, depending upon the nature of the cation present. A second series, also commercially available, known as the X series, has pores of larger size. With such materials, nomenclature indicates crystalline structure type and pore size. "A" denominates one type of structure, "X" another type. Thus 4A is an A type structure with pores of about 4 A. diameter. "13X," commercially available, has X type structure and pores of possibly 13 A., probably about 10 A. Other series, such as the "Y" series, are known, and materials with pore sizes ranging up toward about 15 A. are known. The commercial zeolite materials are usually in the sodium salt form.

The essential or preferred catalytic promotion components are incorporated, by any suitable procedure described hereinafter, on the present catalyst to comprise about 0.5 to 75 percent by weight of the final catalyst composite. The amount of the promotion components will depend on the activity of the specific components used, its intended service, or the presence of a matrix material, which details will also be described more fully hereinbelow.

The essential and preferable promotion components may be added to the crystalline aluminosilicate by any of the procedures as follows: For example, the crystalline aluminosilicate alone or in a matrix may be milled with at least one component selected from the group consisting of sulfur, selenium, tellurium and compounds thereof and subsequently heat treated to effect the combination.

Alternatively, the crystalline aluminosilicate may be milled with at least one component selected from the group consisting of sulfur, selenium, tellurium and compounds thereof and the resulting composite heated with an element or binary compound selected from the group consisting of elements, compounds thereof and mixtures thereof of Groups I-A—V-A, I-B—VII-B and VIII of the Periodic Table.

Or the catalytic promotion components may be added in the gaseous or liquid form, elementally or as a compound, or dissolved in a suitable solvent. For example, vapors of the elements may be passed into the crystalline aluminosilicate to be incorporated therein. The promotion component may be added to the crystalline aluminosilicate at any time prior to the completion of a hydrocarbon conversion in which it might be present. Thus, gaseous components, such as hydrogen sulfide or hydrogen selenide, may be added to the charge stream to the catalyst composite.

While the resulting complex has some of the characteristics of a metal upon a reactive support, there is evidence, presented hereinafter, that the metal in some way becomes involved in the crystalline complex. The resulting material is a highly efficient and highly selective catalyst for the aromatization of paraffin hydrocarbons, as well as for certain other conversions to be described.

As mentioned hereinabove, of the two catalytic promotion components one is essential while the other is preferable. The preferably added component is not considered essential because at least one component falling within its definition is virtually always associated with a crystalline aluminosilicate. For example, alkali metal, hydrogen, calcium or rare earth cations commonly are associated with crystalline aluminosilicates, such cations electrically balancing the negative aluminosilicate charge.

The preferable components include cations, compounds thereof and mixtures of metallic elements of Groups I-A—V-A, I-B—VII-B and VIII of the Periodic Table, which elements may include hydrogen, lithium, sodium, potassium, rubidium, cesium, beryllium, magnesium, calcium, strontium, barium, aluminum, gallium, indium, thallium, germanium, tin, lead, arsenic, antimony, bismuth, copper, silver, gold, zinc, cadmium, mercury, scandium, yttrium, lanthanum, the Lanthanide Series, actinium, the Actinide Series, titanium, zirconium, hafnium, vanadium, niobium, tantalum, chromium, molybdenum, tungsten, iron, cobalt, nickel, ruthenium, rhodium, palladium, osmium, iridium, and platinum. Thus, a preferred component may be associated with the crystalline aluminosilicate, or one or more may be added to the aluminosilicate. Where one or more preferred components are added, most preferably such are selected from cations, compounds thereof and mixtures thereof of elements from Groups V-A, V-B, VI-B and VIII of the Periodic Table. These components have been found most effective in promoting aromatization which will be more fully described subsequently.

In a typical method, the alkali metal crystalline aluminosilicate may be base exchanged or impregnated with a solution of a salt of the preferable component distinct from the alkali metal associated therewith, and subsequently treated with sulfur, selenium, tellurium or compounds thereof. As mentioned above, in alternative embodiments the essential and preferable promotion components may be added to or, alternatively, may be a constituent of the matrix material, rather than added to the crystalline aluminosilicate, either prior to or during the distribution of the aluminosilicate into the matrix.

Suitable sulfur, selenium or tellurium compounds for use as the essential catalytic promotion component include compounds with hydrogen, alkali metals, alkaline earth metals, rare earth metals, and other metals of Groups I-B through VIII of the Periodic Table forming such compounds.

Suitable compounds for use as the preferable catalytic promotion component include the oxides, halides, carbonates, carbonyls, sulfates, sulfites, nitrates, nitrites, phosphates, phosphites, acetates, formates and many other compounds.

It is also suitable to provide both essential and preferable catalytic promotion components in one or more single compound, including iron sulfide, selenide and telluride; cobalt sulfide, selenide and telluride; and nickel sulfide, selenide and telluride; and the like.

If the base-exchange method is employed to incorporate the preferable component, most preferably a crystalline alkali metal aluminosilicate is base exchanged either before or after intimate admixture with a matrix material. Base exchange is effected by treatment with a solution which does not adversely affect the structure of the crystalline aluminosilicate and which is capable of replacing alkali metal ions.

The promotion components may be contacted with the crystalline aluminosilicate of uniform pore structure in the form of a fine powder, a compressed pellet, extruded pellet, spheroidal bead or other suitable particle shape alone or in a matrix material. It has been found that base-exchange, if such method be employed, may be effected most readily if the alkali metal aluminosilicate undergoing treatment has not previously been subjected to a temperature above about 600° F.

Addition of the catalytic promotion components is carried out for a sufficient period of time and under appropriate temperature conditions to incorporate a sufficient amount of the component in the final composite to lie in the ranges defined above.

It is contemplated that any ionizable compound of the preferable components capable of replacing the alkali metal, may be employed for base exchange either alone or in combination with other ions. Suitable materials include soluble compounds of the preferable components hereinabove described, as well as solutions containing mixtures of these ions and mixtures with other ions, such as ammonium, or hydrogen precursors. Organic salts of the foregoing metals, such as carbonyl, acetate and formate, may also be used, as well as very dilute or weak acids.

In order to assure or to maximize uniform cation distribution throughout the pores and cavities of the crystalline aluminosilicate, a competitive exchange technique may be employed for the addition of preferable components by base exchange. In such a technique, ions identical with those cations of the original aluminosilicate (usually sodium) are added to the base exchange solution in order to provide even distribution of the exchange ions and the original (sodium) ions on the aluminosilicate. Otherwise, the exchange ions may tend to concentrate at the outer surfaces of the aluminosilicate. Total concentration is usually at least 3 weight percent of the competing ions, and may be as great as saturated solution. The ratio of original (sodium) to exchange ions is generally in the range of 2:1 to 150:1, and preferably, 5:1 to 50:1. It is preferred, whenever possible, to employ for the competing cations, salts with common anions, e.g. $VSO_4$ and $Na_2SO_4$, NaCl and $MnCl_2$, etc.

While water will ordinarily be solvent in the base-exchange solution used, it is contemplated that other solvents, although generally less preferred for base exchange, may be used in other methods of incorporation, such as from solution. Thus, in addition to aqueous solutions, alcoholic or kerosene solutions, etc., of suitable compounds as noted above, may be employed to incorporating the catalytic promotion components on the catalyst of the present invention. Other solvents, such as dimethyl formamide, may also be suitably employed. It will be understood that the preferable components employed for the base-exchange alternative procedure undergo some ionization in the particular solvent used.

The essential promotion component, e.g., sulfur, selenium, tellurium, compounds and mixtures thereof, may be added to the crystalline aluminosilicate by any suitable method at any time prior to the completion of the aromatization process. When a matrix is employed, the component may be added to the matrix or to the inorganic hydrosol matrix precursor. The component may be added elementally, as a gaseous, liquid or solid component or in solution. Mixtures of the components or their compounds may be added.

Three methods are preferred to add the essential component to the catalyst. In one preferred method sulfur, selenium, tellurium, compounds or mixtures thereof are mixed with the aluminosilicate by tumbling for several hours or by milling for about one hour, and the mixed components are then heated to about 500–1100° F. allowing interaction and uniform distribution of components. A second method is to dissolve the essential component in a suitable solvent, such as carbon disulfide or chloroform; to contact the solution and the crystalline aluminosilicate; and finally to heat the composite whereby the components are interacted and the solvent evaporated. If the charge stock is a suitable solvent, the method is simplified by elimination of the heating step. A final preferred method provides the addition of both an essential component and a preferred component in a single compound such as iron selenide, to the aluminosilicate by either of the above methods.

The concentration of the element or compound when employed in solution may vary depending on the nature of the particular component used, on the crystalline aluminosilicate undergoing treatment and on the conditions under which treatment is effected. The overall concentration of the catalytic promotion component, however, is such as to incorporate a sufficient amount thereof in the aluminosilicate so that the amount of the component in the final composite lies in the ranges defined above. Generally, the concentration of compound in solution is within the range of 0.2 to 30 percent by weight, although as noted hereinabove other solution concentrations may be employed.

The temperature at which incorporation of the catalytic promotion components is effected may vary widely, generally ranging from room temperature to an elevated temperature, but below the boiling point of the treating solution at the pressure of the treatment if a solution is employed. While the volume of a solution of the components employed may vary widely, generally an excess is employed and such excess is removed from contact with the crystalline aluminosilicate after a suitable period of contact.

It will be appreciated that such period of contact may vary widely depending on the temperature, the nature of the alkali metal aluminosilicate used, and the particular compounds employed. Thus, the time of contact may extend from a brief period of the order of a few hours for small particles to longer periods of the order of days for large pellets.

The catalysts utilized in the present process may also be prepared by intimately admixing with a matrix material a crystalline alkali metal aluminosilicate, such as described hereinabove, having a structure of rigid three dimensional networks characterized by a uniform, effective pore diameter between 6 and 15 angstrom units, in finely divided form having a weight mean particle diameter of less than about 10 microns. The essential and preferable catalytic promotion components may be added before or after the crystalline aluminosilicate is incorporated in a matrix material. The components may alternatively be added to the matrix before or during the addition of the crystalline aluminosilicate. Alternatively, the matrix may comprise one of the preferable promotion components, e.g. nickel, whereupon further addition of such component ordinarily is not necessary.

As the matrix component, a number of materials may be employed. The matrix materials may exhibit substantial catalytic activity. Various clays are suitble materials, including for example, bauxite, halloysite, illite, kaolinite, montmorillonite, polygorskite, and the like. The matrix may also comprise an inorganic oxide gel, such as silica, alumina, magnesia, zirconia, beryllia, titania, thoria, strontia, or the like and cogels such as silica-alumina or silica-alumina-zirconia gel. Various refractory metal oxides and silicates are also useful as matrix components including, for example, oxides or silicates of beryllium, magnesium, aluminum, titanium, zirconium, hafnium, thorium, vanadium, nickel, tantalm, chromium, molybdenum, etc. Porous metals, glasses, and various forms of porous carbon may also serve as a matrix for the active crystalline aluminosilicate component. It is also satisfactory to employ combinations of the noted matrix materials.

An inorganic oxide gel is preferable as a matrix for the crystalline aluminosilicate powder distributed therein. Silica gel, as will be evident from data hereinafter set forth, may be utilized as a suitable matrix. Also, the matrix employed may be a cogel of silica and an oxide of at least one metal selected from the group consisting of metals of Groups II–A, III–A, and IV–B of the Periodic Table. Such components include, for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia, and silica-magnesia-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the other metal oxide content ranging from zero to 45 weight percent. Siliceous hydrogels utilized herein and hydrogels obtained therefrom may suitably be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and matrix may vary widely with crystalline aluminosilicate content ranging from about 1 to about 90 percent by weight and more usually, particularly where the composite is prepared in the form of beads, in the range of about 2 to about 50 percent by weight of the composite.

The aluminosilicate product may be prepared in any desired physical form, alone or distributed in a matrix material. In a broader aspect of the invention, no matrix need be employed, and the essential and preferable catalytic promotion components may be added directly to crystalline aluminosilicate particles to form a suitable composition. Preferably, however, a more attrition resistant composite may be realized by incorporating the crystalline aluminosilicate in a suitable matrix material before or after addition of catalytic promotion components. A matrix may, of course, be employed for other reasons, e.g., to provide a heat sink, to reduce effective activity, to alter catalyst selectivity and the like.

Thus, a hydrosol containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of an aluminosilicate-containing hydrogel. Also, a hydrosol may be introduced into the perforations of a perforated plate and retained until the sol has set to a hydrogel, after which the formed hydrogel pieces are removed from the plate. The method of the invention has been found to be particularly useful for the production of catalyst into the form of spheroidal particles. A hydrosol containing powdered aluminosilicate produced in accordance with this invention may be made into spheroidal particles by any feasible process, such as methods described in patents to Marisic, for example, U.S. 2,384,946. Broadly, such methods involve introducing globules of hydrosol into a column of water-immiscible liquid, for example, an oil medium wherein the globules of hydrosol set to a hydrogel and subsequently pass into an underlying layer of water from which they are sluiced to further processing operations such as base-exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spherically shaped particles is of particular advantage in hydrocarbon conversion processes, including the moving catalyst bed processes, the fluidized process, etc., in which the spheroidal gel particles are subjected to continuous movement. As applied to the stationary bed, spheroidal catalyst particles provide effective contact between the reactants and the catalyst by avoiding channeling. It is accordingly a preferred embodiment of the present invention to prepare the described catalyst in the form of spheres of the crystalline aluminosilicate distributed and promoted in a matrix material, although it is to be realized that the method of the invention may also be employed in obtaining a mass of catalyst which may, thereafter, be broken up into particles of desired size. Likewise, the method described herein may be used for the preparation of the present catalysts in the form of particles of any other desired size or shape.

While, for the production of spheroidal catalyst particles by the aforementioned technique, initial formation of a hydrosol which sets upon lapse of a short interval of time to an all embracing bead-form hydrogel is essential, it is within the purview of this invention also to employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two.

In essence then, the catalysts of the present invention may comprise three components: a specified crystalline aluminosilicate and one essential and a second preferable specified catalytic promotion component. Alternatively the two essential and one preferable components may be incorporated in a suitable matrix material.

More specifically, as indicated above, the aromatization catalyst of the present invention comprises a crystalline aluminosilicate having uniform pore openings between about 6 and 15 angstrom units, either alone or incorporated in a matrix, and essentially one and preferably two catalytic promotion components: (1) essentially at least one component selected from the group consisting of sulfur, selenium, tallurium and compounds thereof, and (2) preferably at least one component selected from the group consisting of cations, compounds thereof and mixtures thereof with one another of metallic elements of Groups I–A—V–A, I–B—VII–B and VII of the Periodic Table.

The crystalline aluminosilicate catalyst compositions described above have been found to have a surprisingly very wide range of utility in catalytic conversion processes.

For example the catalysts of the subject invention have been found quite selective to aromatization reactions, aromatization being defined as a generic denomination involving a number of chemical conversion reactions. Commercial aromatization units generally employ platinum catalysts and the like. Such operations are of major significance to the petroleum industry as methods of upgrading petroleum products by converting relatively low octane materials to high octane, predominantly aromatic materials. Aromatization involves one or a combination of more than one of the following major types of reactions: paraffin dehydrocyclization, isomerization and hydrocracking; olefin hydrogenation, dehydrogenation, isomerization and dehydrocyclization; naphthene dehydrogenation, and dehydroisomerization; hydrodesulfurization, and the like.

High aromatization activity has been achieved with the following concentrations of the essential components, based on equivalents per 100 grams of final catalyst composite: sulfur, 0.31–1.25 equiv./100 g.; selenium, 0.13–0.51 equiv./100 g.; and tellurium, 0.08–0.31 equiv./100 g. Additionally, it is preferred to have the following concentration of at least one component selected from the cations or compounds of the following Periodic Table Groups: I–A—IV–A, 0.3–1.25 equiv./100 g.; V–A, 0.08–1.25 equiv./100 g.; I–B—IV–B, 0.25–1.25 equiv./100 g.; V–B—VII–B, 0.08–1.25 equiv./100 g. Generally, for the preferred components of Groups I–A—VV–A, I–B—VII–B, and VIII, the lower concentration limits are particularly applicable when tellurium is the essential component, while the upper concentration limits are applicable when sulfur is the essential component.

As mentioned hereinabove, it has also been found that naphthas may be successfully upgraded by contacting them at suitable conditions of temperature and pressure in the presence of hydrogen with a zinc-containing crystalline aluminosilicate. Thus, the catalyst used in the present invention is prepared from a crystalline aluminosilicate which, after zinc cation exchange, has uniform effective pore openings of about 5 A. in diameter. The most preferred cation solution will be an aqueous solution of a zinc salt such as zinc chloride, zinc acetate, etc. The extent of ion exchange should be sufficient to reduce the alkali metal, e.g., sodium content, of the zeolite to less than about 5 weight percent, preferably less than about 1 weight percent. It will be understood that although the most preferred catalysts will be prepared by using zinc cation as the sole exchanging cation, the presence of zinc together with other exchanging cations will also be highly useful. Thus, the zinc may be introduced alone or with other polyvalent cations by either ion-exchanging the zeolite with mixed salt solution or by sequential ion-exchange treatments. Preferably the zeolite will have a major portion of its cation content supplied by zinc with perhaps minor portions of residual sodium, as well as minor portions of other ions which may also have been introduced via ion exchange for various purposes. As an additional specific embodiment of the invention, it has also been found that, as mentioned earlier, the activity and effectiveness of the catalysts used herein may be substantially improved by contact with sulfur prior to their use in the selective hydrocracking processes. The catalyst is preferably sulf-activated to enhance its activity by contact either with a sulfur-containg feed or, if the feed has a low sulfur content, with hydrogen sulfide or an added sulfur compound which is readily convertible to hydrogen sulfide at the hydro conditions employed, e.g., carbon disulfide, etc. The extent of this sulf-activation treatment should be sufficient to incorporate 0.5 to 15 weight percent sulfur into the catalyst. The beneficial effect of sulf-activation will be demonstrated in the examples to follow.

The aromatization processes in the presence of the catalyst described herein generally take place at about 0.1 to 10 LHSV, about 700 to 1400° F., at about 1 to 800 p.s.i.a. pressure. Such conditions are referred to as "aromatization conditions." Preferably the conditions of operation lie in the following ranges: 0.2 to 5 LHSV, about 900 to 1200° F., at about 1 to 50 p.s.i.a. pressure.

Paraffin dehydrocyclization in the presence of the catalysts employed herein generally is undertaken at about 1 to 10 LHSV, about 700 to 1400° F., at about 1 to 800 p.s.i.a. pressure. Such conditions are referred to as "dehydrocyclization conditions." Preferably the paraffin dehydrocyclization conditions of operation lie in the following ranges: 0.2 to 5 LHSV, about 800 to 1200° F., at about 1 to 75 p.s.i.a. pressure.

The catalysts as described herein have also been found to be active cracking catalysts. For example, alkali metal crystalline aluminosilicates promoted with sulfur have been found to be active cracking catalysts, showing excellent yields in cracking an n-hexane charge. Likewise, crystalline aluminosilicate compositions promoted with about 5 wt. percent selenium or less have been discovered to be good cracking catalysts. Similarly higher amounts of selenium composited with a sodium Y-type zeolite have shown cracking activity, as well as aromatization activity.

Still another instance of the broad utility of the subject catalysts has been in their ability to dehydrogenate paraffins to olefins, as well as olefins to diolefins. For example pentane, propane and methylcyclopropane have been successfully converted to their corresponding olefin in the presence of these catalysts. Conversely, the subject catalysts have been found to hydrogenate olefin hydrocarbons to their respective paraffinic hydrocarbons.

The invention will be further described in conjunction with the following specific examples which are deemed not to be limitative but merely illustrative of the invention.

In the standard hexane conversion test, the catalyst composite is heated to 1000° F. over a stream of helium. A stream of 4:1 volume ratio of helium to normal hexane is then passed over the catalyst at 1000° F. and 1 atmosphere for a 9 second contact time. The products are collected and analyzed to determine the weight percent cracked to a $C_1$–$C_5$ fraction and the weight percent aromatized to benzene. The weight percent benzene in the product indicates aromatization activity, while the percent benzene as a proportion of total conversion indicates aromatization selectivity.

EXAMPLE 1

Use of powdered selenium or tellurium metals dispersed with zeolite (a) A 1.5 ml. sample of 13X was mixed with 1 cc. selenium powder in a test tube. The tube was heated to permit interdispersion and eliminate excess selenium by sublimation. The catalyst was tested for conversion of hexane (see Table I). The finished catalyst contained 8.1% selenium.

(b) The procedure was repeated using 3 ml. 13X and 0.3 mg. tellurium metal. A 1.3 ml. aliquot was used to test hexane conversion (see Table I).

(c) A 13X/selenium mixture (10% Se) was pelleted and than heated at 1000° F. for 15 minutes in flowing helium and then tested for hexane conversion (see Table I).

(d) A 13X/tellurium mixture (15.4% Te) was pelleted and heated at 1000° F. in flowing helium. It was then tested for hexane conversion (see Table I).

TABLE I

| Catalyst | Time on stream, min. | ° F. | Percent $C_1$–$C_5$ | Aromatics | Selectivity |
|---|---|---|---|---|---|
| 13X·Se(a) | 5–28 | 1,000 | 100 | | |
| 13X·Se(a)(regen.) | 27 | 1,000 | 47.9 | 20 | 27.4 |
| 13X·Te(b)(regen.) | 26 | 1,000 | 2.3 | 15.7 | 75.1 |
| 13X·Se(c) | 5 | 1,000 | 44.2 | 55.8 | 55.8 |
|  | 66 | 1,000 | 21.3 | 78.7 | 78.7 |
|  | 156 | 1,000 | 38.4 | 27.4 | 41.1 |
| 13X·Te(d) | 5 | 1,000 | 6.5 | 76.4 | 92.2 |
|  | 44 | 1,000 | 4.3 | 70.8 | 94.3 |
|  | 255 | 1,000 | 1.3 | 22.5 | 95 |
| 13X·Te(d)(regen.) | 5 | 1,000 | 5.3 | 68.7 | 92.8 |

NOTE.—(Regen.) indicates an operation conducted after air regeneration of catalyst.

EXAMPLE 2

Tellurium loading followed by calcining in helium

A sample of the 15.4% Te/13X catalyst described in Example 1(d) was purged in a helium flow at 700–800° F., and 900° F. for one hour each and at 1000° F. for five hours (until constant weight was obtained). A 1.5 ml. aliquot was tested for hexane conversion at 1000° F. in the conventional way except the flow direction of the charge vapors was reversed about once each hour and the inlet lines heated to drive effluent tellurium back to the zeolite base. (See Table II.)

TABLE II

| Time on stream, min. | Flow | Percent $C_1$–$C_5$ | Aromatics | Selectivity |
|---|---|---|---|---|
| 5 | Forward | 9.3 | 87.7 | 90.4 |
| 153 | Reverse | 7.0 | 68.7 | 90.8 |
| 202 | Forward | 9.5 | 51.3 | 84.3 |
| 372 | Reverse | 3.4 | 21.2 | 86.2 |
| 5 [1] | Forward | 7.5 | 62.1 | 89.2 |
| 150 | Reverse | 5.9 | 44.3 | 88.2 |
| 5 [1] | Forward | 10.9 | 60.1 | 84.2 |

[1] Air regeneration (Regen.).

This demonstrates the high activity and selectivity attainable with tellurium loaded zeolites. Most of the activity is restored by air regeneration. Data also show that Te loaded zeolites are preferable over Se.

EXAMPLE 3

Zeolite loading by selenium vapors

A large tube was loaded with 100 ml. of 13X zeolite and placed in a low heat capacity tube furnace at a temperature of 800° F. (raised to 1045° F. over a period of time). A glass tube boiler pot was loaded with about 10 grams of selenium, placed in a vertical tube furnace, and connected to a helium supply and the zeolite treating tube. Helium flow of ~30 ml./minute was passed over the selenium and through the catalyst bed. When the catalyst was dry (2 hours at 800–900° F.), the boiler was heated to 970° F. to 1055° F. over a three hour period. The system was then cooled in helium. The catalyst contained 5% selenium. A 1.5 ml. aliquot of the catalyst was then checked for hexane cracking activity at 1000° F. (See Table III.)

TABLE III

| Time on stream, minutes: | Percent $C_1$–$C_5$ |
|---|---|
| 7 | 82.8 |
| 29 | 82.2 |

Data show that low selenium-content zeolite catalysts of about 5% (wt.) or less selenium content are very active cracking catalysts.

EXAMPLE 4

Tellurium metal on non-zeolites

Samples of A-2 alumina and untempered silica-alumina cracking catalyst were blended with tellurium metal and pelleted. Each of the finished catalysts contained 15% tellurium. A 1.5 ml. aliquot of each was tested for n-hexane conversion at 1000° F. (See Table IV.)

TABLE IV

| Catalyst | Maximum percent | |
|---|---|---|
| | $C_1$-$C_5$ | Aromatics |
| Te·$Al_2O_3$ | 0.6 | 0 |
| Te·$Al_2O_3$(regen.) | 0.5 | Trace |
| Te·$SiO_2$/$Al_2O_3$ | 9.4 | 0.3 |
| Te·$SiO_2$/$Al_2O_3$(regen.) | 9.4 | 0.7 |

[1] Less than 0.1%.

EXAMPLE 5

Sulfur loading on zeolite

Sodium zeolite (13X) was loaded by various means with sulfur, sulfur+air or helium, and many sulfur compounds. Only two samples produced aromatics, one, a 13X purged with $H_2S$ at 700° F. for two hours and the other, 13X purged with $SO_2$ at 720° F. for four hours. The catalysts were tested for hexane conversion at 1000° F. (See Table V.)

TABLE V

| Catalyst | Maximum percent | |
|---|---|---|
| | $C_1$-$C_5$ | Aromatics |
| 13X·$H_2S$ | 66.4 | 0.7 |
| 13X·$SO_2$ | 56.8 | 1.1 |

These examples show that sulfur is much less desirable for dehydrocyclization than are selenium and tellurium.

EXAMPLE 6

Non-alkali metal zeolites (a) An iron loaded X-type zeolite was prepared by treatment with ferrous ammonium sulfate. An aliquot of the dried catalyst was contacted with $H_2Se$. A 1.5 cc. sample was tested for hexane conversion at 1000° F. (see Table VI.)

(b) A 4 ml. sample of calcium zeolite (10X) was heated in a test tube with 0.2 ml. selenium powder using the procedure described in Example 2a. The catalyst was tested for hexane conversion at 1000° F. (See Table VI.)

TABLE VI

| Catalyst | Maximum percent | |
|---|---|---|
| | $C_1$-$C_5$ | Aromatics |
| FeX | 17.5 | 0 |
| $H_2Se$·FeX(a) | 32.2 | 11.5 |
| $H_2Se$·FeX(regen) | 6.9 | 2.6 |
| Se·CaX(b) | 31 | 0 |
| Se·CaX(regen) | 16.2 | 0.4 |

These examples show that non-alkali metal zeolites are less desirable than the alkali metal ones.

EXAMPLE 7

Small pore zeolites

A sodium-A type zeolite (4A) and a ground Nova Scotian mordenite were treated with sublimed selenium in the tube used for making 13X·Se described in Example 3. Selenium content was 0.12%. The catalysts were tested for hexane conversion at 1000° F. (Results are shown in Table VII.)

TABLE VII

| Catalyst | Percent | |
|---|---|---|
| | Maximum $C_1$-$C_5$ | Yields, aromatics |
| Se·4A | 11.4 | 0 |
| Se·mordenite | 1.2 | 0 |

Consideration of the above examples and tables show the following:

A zeolite of pore size capable of accepting a paraffinic reactant can be heated after admixing with powdered selenium or tellurium to form an efficient and selective aromatization catalyst. Examples 1 and 2.

A zeolite of pore sizes capable of accepting a paraffinic reactant can be treated with vapors of selenium or tellurium to form an efficient and selective aromatization catalyst, Example 2. It is noted that tellurium vapor was carried off the catalyst in forward flow and carried back in reverse flow.

A zeolite of pore size capable of accepting a paraffinic reactant, but carrying a low content (about 5% (wt.) or less), of selenium is a very active cracking catalyst and conversely, not an efficient aromatization catalyst. Example 3.

A zeolite of pore size capable of accepting a paraffinic reactant must carry selenium or tellurium content of the order of at least about 5% and preferably at least about 8% (wt.) to become useful as an aromatization catalyst. Example 1, compared with Example 3.

A zeolite of pore size capable of accepting a paraffinic reactant and having a selenium or tellurium content of the order of 12 to 15% (wt.) is preferable for selective and efficient aromatization.

Tellurium is more active than selenium. Example 1.

These catalysts can be effectively regenerated with air. Example 1.

Non-zeolite materials, even microporous acid-site cracking catalysts such as amorphous silica-alumina cracking catalysts, carrying about 15 wt. percent of tellurium are not aromatization catalysts. Example 4.

Alkali metal zeolites are preferable over other ionic forms of zeolites. Example 6.

Zeolite material of pore size not capable of accepting paraffinic reactants are not effective. Example 7.

A preparation of tellurium with a calcium salt of a 10X aluminosilicate gave high conversion of hexane to aromatics, but lost activity more rapidly than the sodium aluminosilicate preparation and there was greater tendency for the removal of tellurium. This indicates a preference for the sodium form of the aluminosilicate.

These materials are also capable of catalyzing dehydrogenation, as well as cracking.

EXAMPLE 8

Selenium on Y-Type Zeolite

A 5 ml. sample of NaY zeolite was heated in a test tube with 0.5 ml. selenium powder. The finished catalyst contained 12.4 wt. percent selenium. On testing for hexane conversion at 1000° F., this catalyst gave 17 wt. percent $C_1$-$C_5$, 1.8 wt. percent benzene and 1.2% of material believed to be cyclohexadiene.

A series of similar exemplary conversions are summarized in Table IX, below, which also serve as examples of the invention.

TABLE IX.—13X Te—CONVERSION, VARIOUS HYDROCARBONS

| Charge | | °F. | Time | Crack., $C_1$-$C_5$ | Arom. | | | | | | Selectivity | | Conv. |
|---|---|---|---|---|---|---|---|---|---|---|---|---|---|
| | | | | | | | | | | | Olefin | DeH | |
| A | $nC_6$ | 1,000 | 5 | 9.0 | 56.0 | | | | | | 86.2 | | |
| | | | 28 | 10.0 | 51.7 | | | | | | 83.8 | | |
| | | | | $C_1$ | $C_2/C_2''$ | $C_3/C_3''$ | $C_4/C_4''$ | $C_5''$ | Hvy | | | | |
| B | $nC_5$ | 1,000 | 5 | 1.8 | 1.0/0.8 | 0.6/2.2 | 0.2/1.4 | 29.5 | 3.1 | | 83.5+ | 72.7 | 40.6 |
| | | | 26 | 1.2 | 0.6/0.7 | 0.3/1.8 | 0.1/1.0 | 20.6 | 5.1 | | 76.8+ | 65.6 | 31.4 |
| | | | | | | | $C_4''$ | | | | | | |
| C | $nC_4$ | 1,000 | 5 | 1.2 | 0.4/0.4 | 0.3/0.5 | 27.3 | | | | 92.8 | 89.8 | 30.4 |
| | | | 25 | 1.1 | 0.4/0.4 | 0.3/0.5 | 28.0 | | | | 93.2 | 90.3 | 31.0 |
| | | | 5 | 1.7 | 81.8 | | | | | 97.9 | | | 83.5 |
| D | $CyC_6$ | 1,000 | 28 | 1.7 | 80.9 | | | | | 97.9 | | | 82.6 |
| | | | 50 | 1.5 | 78.5 | | | | | 98.4 | | | 80.0 |
| | | | | | | MCP'' | | | | | | | |
| | | | 5 | 10.0 | 1.4 | 2.4 | | | | 10.0 | | 17.4 | 13.8 |
| E | MCP | 1,000 | 26 | 0.2 | 0 | 0.9 | | | | 0 | | 82.8 | 1.1 |
| | | | 28 | 0.3 | | 2.7 | | | | 0 | | 90. | 3.0 |
| | | | | $C_3''$ | | | | | | | | | |
| F | }MCP(plus air) (propane) | | | | | | | | | | | | |
| G | }(10 cc./min.) | 1,000 | 5/30 | 17.3/15.9 | | | | | | | ~100 | | 17.3/15.9 |
| | | | | $C_1$-$C_2$ | $C_3$-$H_8$ | | | | | | Hydr. | | |
| H | Propylene (2 cc.+8 cc.- $H_2$/min.) | 1,000 | 15/21/33 | 0.6 | [1] 51.5 | | | | | | 98.1 | | [1] 52.1 |
| | | 1,000 | 6–18 | 0.6 | 51.6 | | | | | | 98+ | | 52.2 |
| J | do | 900 | 29–41 | 0.4 | 29.8–27.3 | | | | | | 98.5 | | 30.2–27.8 |
| | | 800 | 52–63 | 0.4 | 8.7–9.9 | | | | | | 96.1 | | 9.1–10.3 |

[1] Average.

In the above Table IX, run A on hexane shows aromatization, while runs B, on pentane, and C, on propane, show dehydrogenation.

Run D, on cyclohexane, is an aromatization operation.

Run E, methylcyclopentane, shows negligible aromatization, but there is dehydrogenation to methylcyclopentene and some cracking.

The addition of air simultaneously with a charge of methylcyclopentane, Run F, increases the dehydrogenation to methylcyclopentene and increases the selectivity for this reaction.

Run G, propane, gave a dehydrogenation to propylene.

Runs H and J, propylene plus hydrogen, gave high hydrogenation.

It was previously remarked that evidence exists that the addition of selenium and tellurium to crystalline alumino-silicate is more than a mere carrying, supporting, or inclusion in pores. Evidence, based upon studies of the X-ray diffraction pattern of X zerolite including selenium or tellurium, in other words (Se, Te)-Na-zeolite composites, indicates that these are new chemical species. The X-ray diffraction pattern of such materials undergoes some line shifts compared to the pattern of the NaX, showing that previous positions of ions are changed, and thus the chemical bonds are changed. The evidence is summarized in Table X, below, wherein $H_2Se13X$ indicates Na13X treated with $H_2Se$, Se13X is the catalyst of Examples 4 and 1 respectively, and Te13X is the catalyst of Examples 1b, 1d and 2.

TABLE X.—X-RAY ANALYSIS

| | | Percent | | |
|---|---|---|---|---|
| Catalyst | Type | Shift toward Y | Crystallinity, X | Analysis |
| $H_2Se$·13X | XY | 25 | 40 | 2.4 Se. |
| Se·13X | XY | | 55 | 5.0 Se. |
| Se·13X | XY | 20 | 25 | 8.1 Se (Used catalyst). |
| Te.13X | | | | 15.4. |

The aluminosilicate material to be used is obviously one whose pores are capable of penetration by the selenium and tellurium, but the requirement that the pore size be such as to permit acceptance of the reactant material insures that the first pore size requirement is met.

The amount of selenium or tellurium to be incorporated, as pointed out above, should be of the order of about 5% by weight or less, and can range upward to about 20% for selenium and 40% for tellurium.

These catalytic materials may be used for the conversion of hexane to aromatics, for the conversion of low octane number components of petroleum naphthas to aromatics, and for the reforming of petroleum naphthas to gasoline of high antiknock capability arising from a higher content of aromatics. These may be used to catalyze the aromatization of naphthenes and cyclization and aromatization of paraffins.

These catalysts may be used for the conversion of paraffinic materials to materials such as olefins and aromatics.

These catalysts may also be used in hydrogenation reactions.

These catalysts may be used in combination preparations, for example, a cracking operation may be followed by an aromatization operation over these catalysts to raise the octane number of the cracked gasoline produced in the cracking operation.

It is noted that the various conversion operations of the examples are carried out at temperatures of 1000° F., and that at that temperature a migration of tellurium, selenium, or the other elements from the catalyst may occur. While such migration is not of sufficient moment to seriously hamper the contemplated reactions, it does mean a transfer of catalytic material out of the zone where it is used.

To avoid this, when operating temperatures are sufficiently high to cause migration, several methods may be used.

Operation with two consecutive zones of zeolite is indicated to maintain the (Se, Te) content, for example, in the reactor. One zone is elemental containing, the other is not, flow takes place through the first zone followed by the second zone. After a period of operation, flow is reversed in order to reverse migration of metal before "leaching out" of the zones occurs.

The zones may be operated at different temperature, one temperature chosen to optimize reaction in the first zone, the other to optimize collection of migrating element or its hydride.

An oxidizing atmosphere—air or oxygen—may be added prior to the collection zone to facilitate reduction of the hydride to the elemental form.

The second zone may be a non-catalytic (Te, Se), for example, adsorption zone of high-surface area material specifically used for collecting desorbed Se, Te, such as activated carbon, silica gel, or molecular sieve zeolites. Of these, small pore molecular sieve zeolites, such as 4A zeolite may be advantageous because of their ability to collect Se, Te without being accessible to the majority of hydrocarbons. Periodically, Se, Te is carried back into the catalytic zeolite by reverse flushing and heating, or by contacting with a reverse flow of hydrogen, maintaining the collection zone and the catalyst zone at such selected temperatures that hydride formation is favored in the collection zone, and hydride decomposition favored in the catalyst zone.

Examples 9–13 illustrate aromatization/cracking catalysts and processes basic to the present invention. A crystalline sodium 13X aluminosilicate, NaX, was treated by the addition of sulfur, selenium or tellurium. The catalyst was tested for aromatization activity and selectivity as well as cracking activity according to a hexane conversion test, standard, except where noted, for all the following examples.

EXAMPLE 9

An excess of powdered sulfur was blended with crystalline sodium aluminosilicate NaX in a test tube. The composite was heated to effect combination while excess sulfur was driven off. The composite was tested for hexane conversion. A composite of NaX without sulfur promotion was also tested for hexane conversion.

EXAMPLE 10

One ml. of selenium powder was blended with 1.5 ml. of NaX in a test tube and heated to effect combination. The composite contained 8.1 weight percent selenium. The composite was tested for hexane conversion.

EXAMPLE 11

A composite similar to that of Example 10 containing 10 weight percent selenium was pelleted and tested for hexane conversion.

EXAMPLE 12

A composite was prepared by heating in a test tube a mixture of 3 ml. of NaX and 0.3 ml. tellurium metal. The composite was tested for hexane conversion.

EXAMPLE 13

A composite similar to that of Example 12 containing 15.4 weight percent tellurium was pelleted and tested for hexane conversion.

The results of hexane conversion tests for the composite of Examples 9–13 are present below in Table XI. An asterisk (*) indicates that the composite was regenerated in air prior to the test run.

TABLE XI

| Example | Crystalline aluminosilicate | Promotion | Time on stream, min. | Cracking activity | Aromatization Activity | Aromatization Selectivity |
|---|---|---|---|---|---|---|
| 9 | Nax | | | 12.5 | 0 | 0 |
|   | Nax | S | | 81.9 | 2.6 | 3.1 |
| 10 | NaX | Se* | 27 | 47.9 | 20.0 | 29.5 |
|    |     |     | 5  | 44.2 | 55.8 | 55.8 |
| 11 | NaX | Se  | 66 | 21.3 | 78.7 | 78.7 |
|    |     |     | 156 | 38.4 | 27.4 | 41.7 |
| 12 | NaX | Te* | 26 | 2.3 | 15.7 | 87.2 |
|    |     |     | 5  | 6.5 | 76.4 | 92.2 |
| 13 | Nax | Te  | 44 | 4.3 | 70.8 | 94.3 |
|    |     |     | 255 | 1.3 | 22.5 | 94.5 |
|    |     |     | 5  | 5.3 | 68.7 | 92.8 |

Examples 9–13 illustrate clearly the remarkable effect the addition of sulfur, selenium or tellurium to a crystalline aluminosilicate has in providing an aromatization catalyst composite of high activity and selectivity, as well as an active cracking catalyst. Even more effective composites are obtainable in preferred embodiments of the invention illustrated in subsequent examples.

The sodium cation was employed in the crystalline aluminosilicate composites of Examples 9–13, which examples illustrate the presence of a preferable promotion component of Group I–A of the Periodic Table. The following Examples 14–33 illustrate the effect of the presence of a preferable promotion component with the crystalline aluminosilicate, either originally or by addition, from Groups I–A—V–A, I–B—VII–B and VIII in addition to the essential component selected from the group consisting of sulfur, selenium, tellurium, compounds thereof and mixtures thereof.

In Examples 14–33, the preferable promotion component either was present originally in the aluminosilicate or was added by cation exchange, except where alternative methods are specified. Cation exchange was effected by a competitive exchange technique described hereinabove whereby an excess of the sodium ion was present as the competing cation to give a uniform low level exchange.

Each composite of Examples 14–33 was tested for hexane conversion both before and after addition of the essential promotion component. Except where noted the essential promotion component was sulfur, composited by fusion according to the method of Example 9. Parenthetical roman numerals and letters indicate the Periodic Table grouping of the preferred components in each case.

EXAMPLE 14

A rubidium (I–A) crystalline X aluminosilicate (RbX) was employed according to the standard procedure.

EXAMPLE 15

A hydrogen (I–A) mordenite crystalline aluminosilicate was employed according to the standard procedure.

EXAMPLE 16

Sodium X crystalline aluminosilicate was base exchanged competitively as described above with magnesium (II–A) nitrate and employed according to the standard procedure.

EXAMPLE 17

Commercially available calcium (II–A) 10X crystalline aluminosilicate (CaX) was employed according to the standard procedure.

EXAMPLE 18

Sodium Y crystalline aluminosilicate (NaY) was base exchanged competitively with barium (II–A) hydroxide and employed according to the standard procedure.

EXAMPLE 19

Sodium Y crystalline aluminosilicate was base exchanged competitively with aluminum (III–A) nitrate and employed according to the standard procedure.

EXAMPLE 20

Sodium X crystalline aluminosilicate was base exchanged competitively with stannous (IV–A) chloride and employed according to the standard procedure.

EXAMPLE 21

A 4.5-gram sample of sodium X crystalline aluminosilicate was ball milled with 0.5 gram of bismuth (V–A) trioxide, calcined at 1000° F. and employed according to the standard procedure. For this example, sulfur promotion was effected by pretreatment with hydrogen sulfide.

EXAMPLE 22

Sodium X crystalline aluminosilicate was base exchanged competitively with silver (I–B) nitrate and employed according to the standard procedure.

EXAMPLE 23

Sodium X crystalline aluminosilicate was base exchanged competitively with copper (I–B) sulfate and employed according to the standard procedure.

EXAMPLE 24

Sodium X crystalline aluminosilicate was base exchanged competitively with mercurous (II–B) acetate and employed according to the standard procedure. The hexane conversion was run at 850° F. for this example.

EXAMPLE 25

Sodium X crystalline aluminosilicate was base exchanged competitively with zinc (II–B) chloride and employed according to the standard procedure.

EXAMPLE 26

A rare earth X crystalline aluminosilicate (REX) was steamed for 24 hours at 1000° F. and employed according to the standard procedure.

EXAMPLE 27

Sodium Y crystalline aluminosilicate was soaked in a titania (IV–B) suspension and employed according to the standard procedure.

EXAMPLE 28

Sodium X crystalline aluminosilicate was base exchanged competitively with zirconium (IV–B) chloride and employed according to the standard procedure.

EXAMPLE 29

Sodium X crystalline aluminosilicate was base exchanged competitively with vanadium (V–B) sulfate and employed according to the standard procedure.

EXAMPLE 30

Sodium X crystalline aluminosilicate was base exchanged competitively with chromium (VI–B) nitrate and employed according to the standard procedure.

EXAMPLE 31

Sodium X crystalline aluminosilicate was base exchanged competitively with manganese (VII–B) chloride and employed according to the standard procedure.

EXAMPLE 32

Commercially available palladium (VIII) impregnated hydrogen Y crystalline aluminosilicate (PdHY) was employed according to the standard procedure.

EXAMPLE 33

Sodium Y crystalline aluminosilicate was impregnated with chloroplatinic acid to give a composite containing 0.25 weight percent platinum (VIII) and employed according to the standard procedure.

The results of the hexane conversion tests for Examples 14–33 are presented below in Table XII. It can be readily seen that the addition of sulfur as a promotion component to crystalline aluminosilicates effects a final composite active for aromatization and cracking. The crystalline aluminosilicates employed each contained, originally or by addition, at least one preferable promotion component of Groups I–A—V–A, I–B—VIIB and VIII of the Periodic Table.

TABLE XII

| Example | Original crystalline aluminosilicate | Essential promotion component | Preferable promotion component | Cracking activity | Aromatization Activity | Aromatization Selectivity |
|---|---|---|---|---|---|---|
| 14 | RbX | | Rb(IA) | 7.6 | 0 | 0 |
|  |  | S | Rb(IA) | 81.9 | 2.6 | 3.1 |
| 15 | H Mordenite | | H(IA) | 100.0 | 0 | 0 |
|  |  | S | H(IA) | 96.9 | 2.3 | 2.3 |
| 16 | NaX | | Mg(IIA) | 14.8 | 0 | 0 |
|  |  | S | Mg(IIA) | 84.1 | 5.5 | 6.1 |
| 17 | CaX | | Ca(IIA) | 21.0 | 0 | 0 |
|  |  | S | Ca(IIA) | 75.9 | 6.7 | 8.8 |
| 18 | NaY | | Ba(IIA) | 36.6 | 0 | 0 |
|  |  | S | Ba(IIA) | 51.7 | 1.4 | 2.6 |
| 19 | NaY | | Al(IIIA) | 40.6 | 0 | 0 |
|  |  | S | Al(IIIA) | 84.8 | 2.2 | 2.5 |
| 20 | NaX | | Sn(IVA) | 6.9 | 0 | 0 |
|  |  | S | Sn(IVA) | 81.1 | 8.6 | 9.8 |
| 21 | NaX | | Bi(VA) | 15.8 | 0 | 0 |
|  |  | S | Bi(VA) | 73.9 | 16.1 | 17.9 |
| 22 | NaX | S | Ag(IB) | 57.8 | 3.4 | 5.6 |
| 23 | NaX | | Cu(IB) | | 0 | 0 |
|  |  | S | Cu(IB) | 75.8 | 7.5 | 9.0 |
| 24 | NaX | | Hg(IIB) | 76.2 | 0 | 0 |
|  |  | S | Hg(IIB) | 50.5 | 0.6 | 1.2 |
| 25 | NaX | | Zn(IIB) | 1.0 | 0 | 0 |
|  |  | S | Zn(IIB) | 38.6 | 0.8 | 2.0 |
| 26 | REX | | RE(IIIB) | 82.2 | 0 | 0 |
|  |  | S | RE(IIIB) | 73.9 | 1.5 | 2.0 |
| 27 | NaY | | Ti(IVB) | 9.0 | 0 | 0 |
|  |  | S | Ti(IVB) | 76.4 | 4.4 | 5.8 |
| 28 | NaX | | Zi(IVB) | 30.8 | 0 | 0 |
|  |  | S | Zi(IVB) | 55.9 | 0.8 | 1.4 |
| 29 | NaX | | V(VB) | | 0 | 0 |
|  |  | S | V(VB) | 79.9 | 19.3 | 19.4 |
| 30 | NaX | | Cr(VIB) | 15.1 | 0 | 0 |
|  |  | S | Cr(VIB) | 66.5 | 29.1 | 30.4 |
| 31 | NaX | | Mn(VIIB) | 3.2 | 0 | 0 |
|  |  | S | Mn(VIIB) | 58.6 | 2.0 | 3.3 |
| 32 | PdHY | | Pd(VIII) | 100.0 | 0 | 0 |
|  |  | S | Pd(VIII) | 76.0 | 22.6 | 22.9 |
| 33 | NaY | | Pt(VIII) | 20.6 | 0.5 | 2.4 |
|  |  | S | Pt(VIII) | 70.9 | 5.0 | 6.6 |

Examples 34–44 illustrate the addition of especially preferred promotion components to a crystalline aluminosilicate promoted with an essential component. These examples also illustrate alternative techniques for the addition of the promotion components, e.g., co-ball-milling, pretreatment, in-charge treatment, multiple components in a single compound, etc.

EXAMPLE 34

A 35 ml. (20 grams) sample of crystalline sodium 13X aluminosilicate was treated at between about 395 and 480° F. with a 25 percent iron penta carbonyl soltuion in kerosine for 1.25 hours. A total of 21.6 ml. of iron carbonyl solution was added to the crystalline aluminosilicate. The crystalline sodium 13X aluminosilicate promoted with iron was heated in a helium stream at between about 480 and 645° F. for one hour to remove the kerosine and to decompose the iron carbonyl. At 1.5 ml. aliquot of the iron promoted crystalline alumino-silicate was tested for n-hexane conversion at a contact time of 9 seconds at 100° F. and one atmosphere pressure.

The catalyst used above was generated in air and tested again for n-hexane conversion, with and without promotion with hydrogen sulfide.

EXAMPLE 35

A portion of the catalyst of Example 34 was promoted with selenium by treatment for 3 hours at 730° F. in a stream of heilum and moist hydrogen selenide. The hydrogen selenide was generated by placing aluminum selenide into water. The catalyst was tested for n-hexane conversion.

EXAMPLE 36

A portion of the catalyst from Example 34 was treated similarly to that of Example 35 except that the hydrogen selenide into water. The catalyst was tested for n-hexane taining anhydrous calcium sulfate prior to contacting the iron-promoted crystalline aluminosilicate. The catalyst was tested for n-hexane conversion.

EXAMPLE 37

A sample of crystalline sodium 13X aluminosilicate was base exchanged with an aqueous solution containing calcium chloride and cobaltous chloride in a 50:1, $CaCl_2:CoCl_2$ ratio. The catalyst was dried and tested for n-hexane conversion in the presence and in the absence of hydrogen sulfide promotion.

EXAMPLE 38

A sample of the catalyst of Example 37, cobalt-promoted 13X, was promoted with hydrogen selenide according to the method of Example 36. The catalyst was tested for n-hexane conversion.

The results of the tests of the catalyst of Examples 34 through 38 are presented below in Table XIII.

TABLE XIII

| Example No. | Original crystalline aluminosilicate | Promotion components | On stream time, min. | Cracking activity | Aromatization | |
|---|---|---|---|---|---|---|
| | | | | | Activity | Selectivity |
| 34 | NaX | Fe(CO)$_5$ (calcined) | 5 | 45.6 | 5.1 | 10.1 |
| | | | 25 | 33.7 | 6.2 | 15.5 |
| | Regenerated NaX plus Fe(CO)$_5$ (calcined). | ---- | 5 | 15.7 | 0.9 | 5.4 |
| | | H$_2$S (in charge) | 45 | 39.4 | 50.0 | 55.9 |
| | | ----do---- | 86 | 35.1 | 62.1 | 63.9 |
| | | H$_2$S off | 110 | 35.9 | 31.8 | 47.5 |
| | | ----do---- | 130 | 31.9 | 25.9 | 44.8 |
| 35 | NaX | Fe(CO)$_5$ (calcined) plus H$_2$Se (moist). | 5 | 38.0 | 61.7 | 61.9 |
| | | | 26 | 27.9 | 71.9 | 72 |
| | | | 51 | 18.4 | 68.5 | 79 |
| 36 | NaX | Fe(CO)$_5$ (calcined) plus H$_2$Se (dry). | 5 | 52.3 | 47.5 | 47.6 |
| | | | 26 | 36.3 | 63.6 | 63.7 |
| | | | 53 | 12.4 | 76.2 | 86 |
| 37 | Ca, Co exchanged 13X | CoCl$_2$ (base-exchanged). CoCl$_2$ (base-exchanged) plus H$_2$S. | 27 | 18.9 | 2.6 | 12.1 |
| | | | 110 | 10.9 | 8.9 | 45 |
| 38 | ----do---- | CoCl$_2$ (base-exchanged). CoCl$_2$ (base-exchanged) plus H$_2$Se (dry). | 5 | 90 | 9.6 | 9.6 |
| | | | 26 | 3.2 | 25.3 | 91 |

EXAMPLE 39

The catalyst of Example 21 was regenerated in air and tested for n-hexane conversion, with hydrogen sulfide present in the charge stream.

EXAMPLE 40

A 4.5 gram sample of crystalline sodium 13X aluminosilicate was ball-milled with 0.5 gram of bismuth powder and calcined at 1000° F. for about 30 minutes. The catalyst was tested for n-hexane conversion.

EXAMPLE 41

A portion of the catalyst of Example 40 was regenerated in air. The catalyst was tested for n-hexane conversion, with hydrogen sulfide in the charge stream.

EXAMPLE 42

A 4.5 gram sample of crystalline sodium 13X aluminosilicate was ball-milled with antimony pentasulfide and calcined at 1000° F. for about 30 minutes. The catalyst was tested for n-hexane conversion.

EXAMPLE 43

A portion of the catalyst of Example 42 was regenerated in air and treated with hydrogen sulfide. The catalyst was tested for n-hexane conversion.

EXAMPLE 44

A portion of the catalyst of Example 43 was tested for n-hexane conversion in the presence of hydrogen sulfide in the charge stream.

The results of the tests of the catalysts of Examples 39–44 are presented in Table XIV below.

TABLE XIV

| Example | Original crystalline aluminosilicate | Promotion components | On stream time, min. | Cracking activity | Aromatization | |
|---|---|---|---|---|---|---|
| | | | | | Activity | Selectivity |
| 39 | Ex. 21 catalyst regenerated NaX plus Bi$_2$O$_3$ plus H$_2$S. | H$_2$S (in charge) | 5 | 72.7 | 16.9 | 18.9 |
| | | | 49 | 72.2 | 21.8 | 23.2 |
| | | | 102 | 69.3 | 18.6 | 21.2 |
| 40 | NaX | Bi (calcined) | 23 | 12.9 | 0 | 0 |
| 41 | Ex. 40 catalyst regenerated NaX plus Bi. | H$_2$S (in charge) | 70 | 67.6 | 15.5 | 18.6 |
| 42 | NaX | Sb$_2$S$_5$ (calcined) | 46 | 52.7 | 30.8 | 56.9 |
| | | | 5 | 27.0 | 50.3 | 65.1 |
| 43 | Ex. 42 catalyst regenerated NaX plus Sb$_2$S$_5$. | H$_2$S (pretreated) | 25 | 39.6 | 31.5 | 44.3 |
| | | | 5 | 27.0 | 32.1 | 54.3 |
| 44 | Ex. 43 catalyst | H$_2$S (in charge) | 38 | 10.6 | 15.2 | 59.0 |

EXAMPLE 45

For the purposes of comparison and in order to demonstrate more clearly the unexpected benefit of the essential components of the catalyst compositions of the present invention, a 4.5 gram sample of α-alumina was ball-milled with 0.5 gram of antimony pentasulfide and calcined at 1000° F. for 30 minutes. The catalyst was tested for n-hexane conversion.

EXAMPLES 46 AND 47

Also for comparative purposes samples of A-2 alumina (Example 46) and untempered silica-alumina (Example 47) were blended with tellurium metal and pelleted, the final composites each containing 15 weight percent tellurium. Each composite was tested for hexane conversion. An asterisk (*) indicates that a composite regenerated in air was employed. The results of the hexane conversion tests for Examples 45–47 are presented below in Table XV.

TABLE XV

| Example | Support | Promotion component | On stream time, min. | Cracking activity | Aromatization Activity | Aromatization Selectivity |
|---|---|---|---|---|---|---|
| 45 | =Al₂O₃ | Sb₂S₅ | 5 | 4.3 | 0.2 | 4.4 |
|   |   |   | 25 | 2.4 | 0.1 | 4.0 |
| 46 | A-2 Al₂O₃ | Te | ......... | 0.6 | 0 | 0 |
|   | A-2 Al₂O₃* | Te | ......... | 0.5 | 0 | 0 |
| 47 | SiO₂-Al₂O₃ | Te | ......... | 9.4 | 0.3 | 3.1 |
|   | SiO₂-Al₂O₃* | Te | ......... | 9.4 | 0.7 | 6.4 |

The above examples clearly show the remarkable utility of the catalyst of the present invention for aromatization operation. Manifestly, the composite containing a crystalline aluminosilicate and the two catalytic promotion components exhibits vastly superior activity for aromatization than compositions lacking one of the two essential or three preferable components. Thus, composites lacking either: (1) a crystalline aluminosilicate (Ex. 45–47) or (2) the essential promotion component (Ex. 9, 14–21, 23–33 and 40) characteristically exhibited inordinately low or substantially no conversion to aromatics.

Examples 34–38 clearly show the benefit of the essential and preferably promoter component. Thus, in Example 34, conversion to benzene was only 0.9 weight percent with an iron-promoted crystalline aluminosilicate, but was as high as 62.1 weight percent with the use of an iron-plus-hydrogen sulfide-promoted crystalline aluminosilicate. Comparison of Examples 35 and 36 shows a slightly deleterious effect from the presence of water.

It will be evident from the foregoing examples that crystalline aluminosilicates promoted with: (1) essentially at least one component selected from the group consisting of sulfur, selenium, tellurium and compounds thereof, and (2) preferably at least one component selected from the group consisting of cations and compounds thereof of elements of Groups I–A–V–A, I–B—VII–B and VIII of the Periodic Table, become vastly improved aromatization catalysts. When used in aromatization processes, the present catalyst compositions exhibit unexpectedly high activity for selective conversion of hydrocarbon compounds to aromatic compounds.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

We claim:

1. A hydrocarbon conversion process which comprises contacting under catalytic conversion conditions a hydrocarbon charge with a catalyst having a composition comprising a crystalline aluminosilicate of ordered internal structure and a material selected from the group consisting of sulfur, selenium, tellurium, a metal selenide and a metal telluride.

2. A process for dehydrocyclization of predominantly paraffin hydrocarbon compounds capable of dehydrocyclization which comprises contacting at least one of said compounds under dehydrocyclization conditions with a catalyst having a composition comprising a crystalline aluminosilicate of ordered internal structure and a material selected from the group consisting of sulfur, selenium, tellurium, a metal selenide and a metal telluride.

3. A conversion process according to claim 1 wherein said conversion comprises dehydrogenation of predominantly paraffin hydrocarbons to their respective corresponding olefins.

4. A conversion process according to claim 1 wherein said conversion comprises hydrogenation of olefin hydrocarbons to their respective corresponding paraffinic hydrocarbons.

5. A process according to claim 1 wherein said conversion comprises contacting said hydrocarbon charge under catalytic cracking conditions.

6. A catalytic cracking process which comprises contacting under catalytic conversion conditions a hydrocarbon charge with a catalyst having a composition which comprises an alkali metal crystalline aluminosilicate of ordered internal structure; having an effective pore diameter between 5 and 15 Angstrom units and sulfur.

7. A process according to claim 1 wherein said conversion comprises contacting said hydrocarbon charge under catalytic reforming conditions.

8. A process for aromatizing hydrocarbon compounds capable of aromatization, which comprises contacting under aromatization conditions at least one of said compounds with an aromatization catalyst composition, comprising a crystalline aluminosilicate having uniform pore openings between about 6 and 15 Angstrom units and a component selected from the group consisting of sulfur, selenium, tellurium, a metal selenide, a metal telluride, and mixtures thereof with one another, said sulfur comprising between about 0.5 and about 75 percent by weight of the final catalyst composition.

9. The process of claim 8 wherein said component is at least one member selected from the group consisting of selenium and metal selenides.

10. The process of claim 8 wherein said component is at least one member selected from the group consisting of tellurium and metal tellurides.

11. A process for aromatizing compounds capable of aromatization, which comprises contacting at least one of said compounds, under aromatization conditions with an aromatization catalyst composition comprising between about 1 and 90 percent of a crystalline aluminosilicate having uniform pore openings between about 6 and 15 angstrom units and between about 0.5 and 15 percent of at least one component selected from the group consisting of sulfur, selenium, tellurium, a metal selenide and a metal telluride distributed in a matrix material said percentages by weight based upon the final catalyst composition.

12. The hydrocarbon aromatization process of claim 11, wherein said matrix material is silica-alumina.

13. A process for dehydrocyclization of predominantly paraffin hydrocarbon compounds capable of dehydrocyclization which comprises contacting at least one of said compounds under dehydrocyclization conditions with a catalyst composition, comprising a crystalline aluminosilicate having uniform pore openings between about 6 and 15 angstrom units and at least one component selected from the group consisting of sulfur, selenium, tellurium, a metal selenide and a metal telluride, said sulfur comprising between about 0.5 and about 75 percent by weight of the final catalyst composition.

14. A process for dehydrocyclization of predominantly paraffin hydrocarbon compounds capable of dehydrocyclization which comprises contacting at least one of said compounds under dehydrocyclization conditions with a catalyst composition, comprising between about 1 and 90 percent of a crystalline aluminosilicate having uniform pore openings between about 6 and 15 angstrom units and between about 0.5 and 75 percent of at least one component selected from the group consisting of sulfur, selenium, tellurium, a metal selenide and a metal telluride distributed in a matrix material, said percentages by weight based upon the final catalyst composition.

15. A process for aromatizing hydrocarbon compounds capable of aromatization, which comprises contacting at least one of said compounds under aromatization conditions with an aromatization catalyst composition comprising a crystalline aluminosilicate having uniform pore openings between about 6 and 15 angstrom units; a component selected from the group consisting of sulfur, selenium, tellurium, a metal selenide, a metal telluride and mixtures with one another, said sulfur comprising between about 0.5 and about 75 percent by weight of the final catalyst composition and at least one component selected from the group consisting of cations and compounds thereof of metallic elements of Groups I-A—V-A, I-B—VII-B and VIII of the Periodic Table.

16. A process for aromatizing compounds capable of aromatization, which comprises contacting at least one of said compounds, under aromatization conditions with an aromatization catalyst composition comprising between about 1 and 90 percent of a crystalline aluminosilicate having uniform pore openings between about 6 and 15 angstrom units, between about 0.5 and 30 percent of at least one component selected from the group consisting of sulfur, selenium, tellurium, a metal selenide and a metal, telluride, and between about 0.5 and 30 percent of at least one component selected from the group consisting of cations and compounds thereof of metallic elements of Groups I-A—V-A, I-B—VII-B and VIII of the Periodic Table distributed in a matrix material; said percentages by weight based upon the final catalyst composition.

17. A process for aromatizing hydrocarbon compounds capable of aromatization, which comprises contacting at least one of said compounds under aromatization conditions with an aromatization catalyst composition comprising a crystalline aluminosilicate having uniform pore openings between about 6 and 15 angstrom units; at least one component selected from the group consisting of sulfur, selenium, tellurium, a metal selenide and a metal telluride, said sulfur comprising between about 0.5 and about 75 percent by weight of the final catalyst composition; and at least one component selected from the group consisting of cations and compounds thereof of metallic elements of Groups V-A, V-B, VI-B and VIII of the Periodic Table.

18. The aromatization process of claim 17 wherein said aromatization catalyst composition comprises at least one component selected from the group consisting of cations and compounds thereof metallic elements of Group V-A of the Periodic Table.

19. The aromatization process of claim 17 wherein said aromatization catalyst composition comprises at least one component selected from the group consisting of cations and compounds thereof of metallic elements of Group V-B of the Periodic Table.

20. The aromatization process of claim 17 wherein said aromatization catalyst composition comprises at least one component selected from the group consisting of cations and compounds thereof of metallic elements of Group VI-B of the Periodic Table.

21. The aromatization process of claim 17 wherein said aromatization catalyst composition comprises at least one component selected from the group consisting of cations and compounds thereof of metallic elements of Group VIII of the Periodic Table.

22. A process for aromatizing compounds capable of aromatization, which comprises contacting at least one of said compounds, under aromatization conditions with an aromatization catalyst composition comprising between about 1 and 90 percent of a crystalline aluminosilicate having uniform pore openings between about 6 and 15 angstrom units; between about 0.5 and 30 percent of at least one component selected from the group consisting of sulfur, selenium, tellurium, a metal selenide and a metal telluride; and between about 0.5 and 30 percent of at least one component selected from the group consisting of cations and compounds thereof of metallic elements of Groups V-A, V-B, and VI-B and VIII of the Periodic Table distributed in a matrix material; said percentages by weight and based upon the final catalyst composition.

References Cited

UNITED STATES PATENTS

| | | | |
|---|---|---|---|
| 1,840,450 | 1/1932 | Jaeger et al. | 208—120 |
| 2,161,066 | 6/1939 | La Lande | 260—684 |
| 2,971,904 | 2/1961 | Gladrow et al. | 208—135 |
| 3,013,984 | 12/1961 | Breck | 252—455 |
| 3,140,253 | 7/1964 | Plank et al. | 208—120 |
| 3,197,398 | 7/1965 | Young | 252—439 |
| 3,331,768 | 7/1967 | Mason et al. | 208—111 |
| 3,471,412 | 10/1969 | Miale et al. | 252—455 |

HERBERT LEVINE, Primary Examiner

U.S. Cl X.R.

208—135; 252—439, 455; 260—673.5, 683.3, 683.9

PO-1050
(5/69)

UNITED STATES PATENT OFFICE
CERTIFICATE OF CORRECTION

Patent No. 3,583,903        Dated June 8, 1971

Inventor(s) Joseph N. Miale and Paul B. Weisz

It is certified that error appears in the above-identified patent and that said Letters Patent are hereby corrected as shown below:

| | |
|---|---|
| Column 10, line 5 | "than" should be --then-- |
| Column 14, line 17 (Table IX) | "82.8" should be --81.8-- |
| Column 19, line 30 | "100°F" should be --1000°F-- |
| Column 19, line 37 | "heilum" should be --helium-- |
| Column 19, line 45 | after "selenide" insert --was dried by passage through a drying tube containing anhydrous calcium sulfate prior to contacting the iron-promoted crystalline aluminosilicate.-- |

Same column 19, lines 45 - 47, cancel "into water. The catalyst was tested for n-hexane taining anhydrous calcium sulfate prior to contacting the iron-promoted crystalline aluminosilicate."

Signed and sealed this 9th day of May 1972.

(SEAL)
Attest:

EDWARD M. FLETCHER, JR.
Attesting Officer

ROBERT GOTTSCHALK
Commissioner of Patents